No. 786,513. PATENTED APR. 4, 1905.
E. M. ORTON.
HAY GATHERER AND STACKER.
APPLICATION FILED NOV. 28, 1904.
3 SHEETS—SHEET 1.
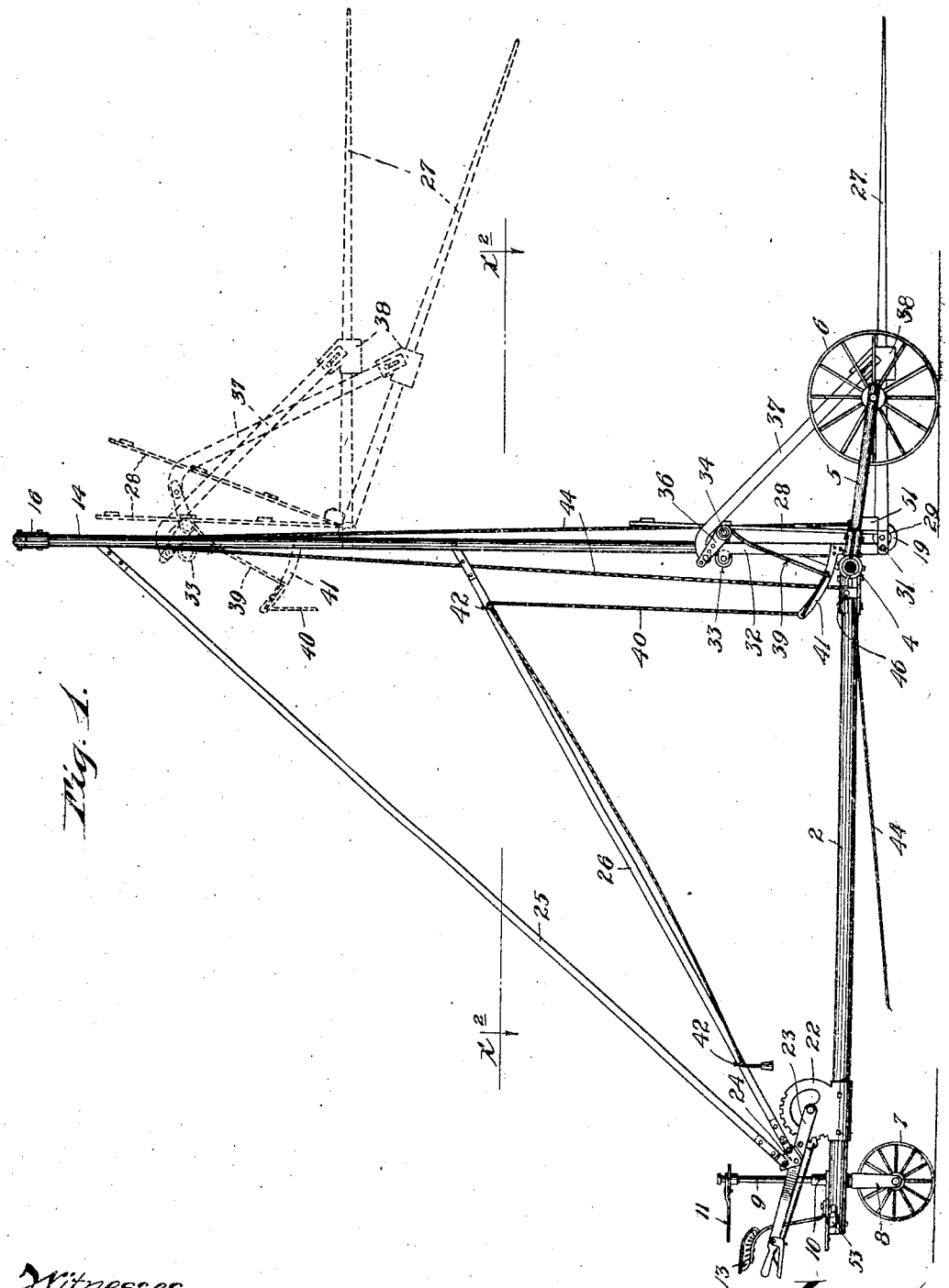

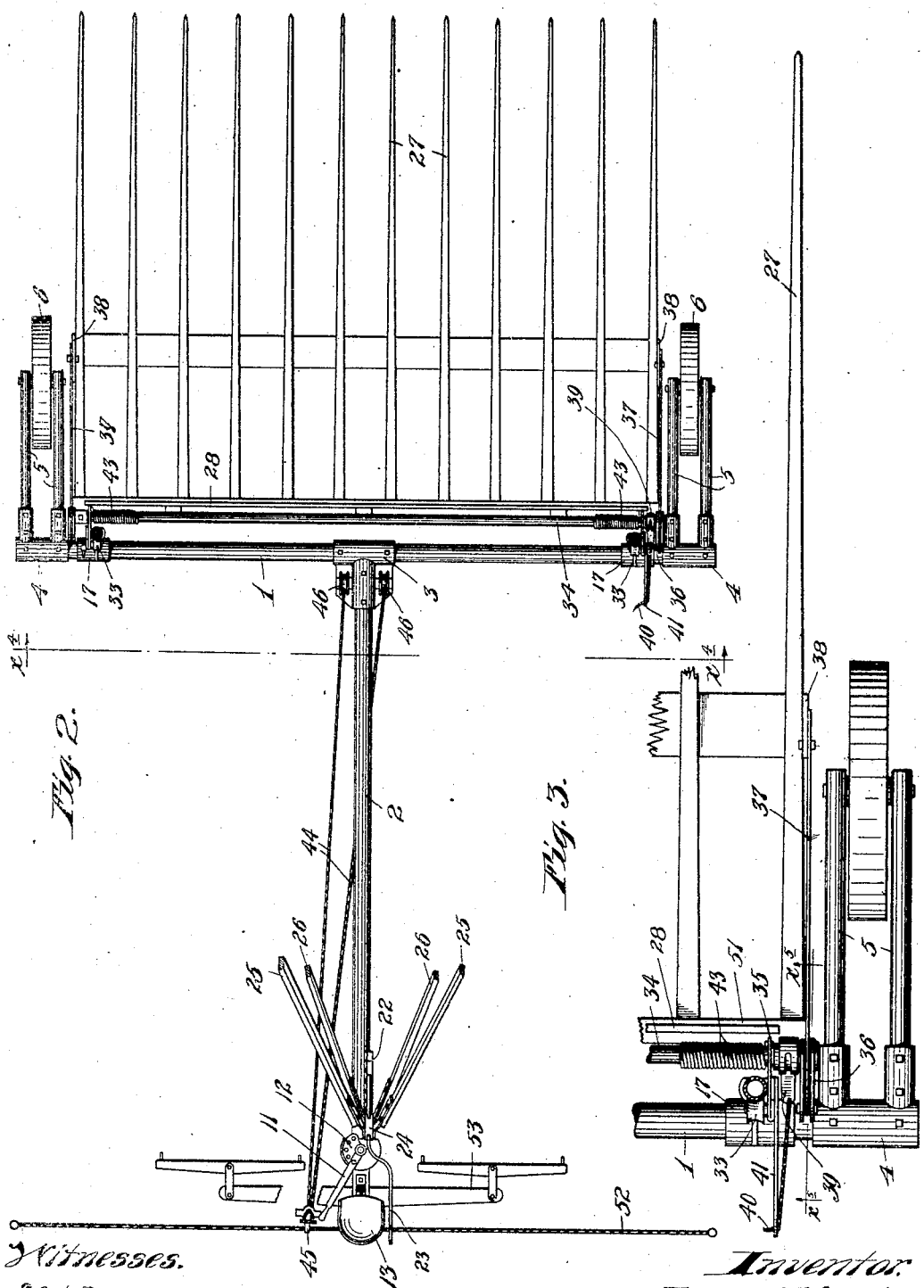

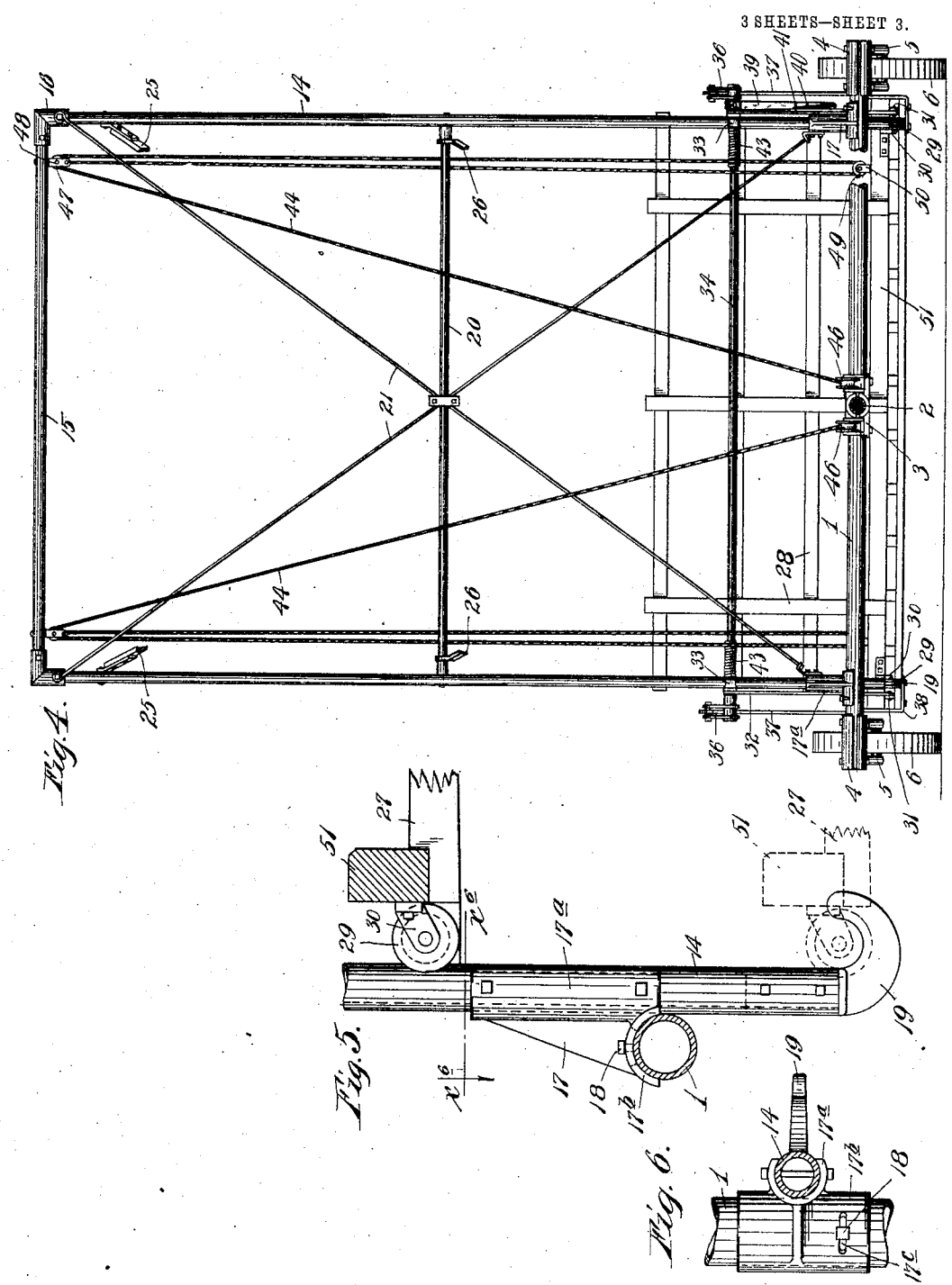

No. 786,513.

Patented April 4, 1905.

UNITED STATES PATENT OFFICE.

EDWARD M. ORTON, OF MINNEAPOLIS, MINNESOTA, ASSIGNOR OF ONE-HALF TO CARRIE J. JAMESON, OF MINNEAPOLIS, MINNESOTA.

HAY GATHERER AND STACKER.

SPECIFICATION forming part of Letters Patent No. 786,513, dated April 4, 1905.

Application filed November 28, 1904. Serial No. 234,508.

*To all whom it may concern:*

Be it known that I, EDWARD M. ORTON, a citizen of the United States, residing at Minneapolis, in the county of Hennepin and State of Minnesota, have invented certain new and useful Improvements in Hay Gatherers and Stackers; and I do hereby declare the following to be a full, clear, and exact description of the invention, such as will enable others skilled in the art to which it appertains to make and use the same.

My invention relates to combined hay gatherers and stackers, and has for its object to improve the same in point of simplicity and durability of construction and efficiency and ease of action.

To the above ends the invention consists of the novel devices and combinations of devices hereinafter described, and defined in the claims.

The improved machine is illustrated in the accompanying drawings, wherein like characters indicate like parts throughout the several views.

Figure 1 is a view in right side elevation, showing my improved gatherer and stacker. Fig. 2 is a horizontal section taken approximately on the line $x^2$ $x^2$ of Fig. 1, some parts being broken away and some parts being removed. Fig. 3 is an enlarged view in horizontal section, taken on the same line as Fig. 2, but showing only the extreme right-hand portion of the machine. Fig. 4 is a transverse vertical section taken on the line $x^4$ $x^4$ of Fig. 2. Fig. 5 is a detail in section approximately on the line $x^5$ $x^5$ of Fig. 3, some parts being broken away and some parts being removed; and Fig. 6 is a horizontal section on the line $x^6$ $x^6$ of Fig. 5.

In this preferred form of the machine the frame of the carrying-truck is made up of metallic tubes or pipe-sections which are rigidly united by suitable joint-castings, thereby giving a frame which is very light and at the same time very strong. This machine, it may here be premised, is pushed forward by horses or other draft-animals hitched to a rearwardly-projecting pole or reach-beam which constitutes a part of the truck-frame, and the machine is supported by three wheels, two of which are located in front of the pole on the opposite sides of a gathering-rake and the third of which is mounted at the rear end of the pole and is used as a steering-wheel to guide the machine.

Of the parts of the machine-frame proper the numeral 1 indicates a transverse pipe, to the central portion of which the forward end of a heavy push-pole or reach-beam 2 is rigidly secured by means of a strong coupling-bracket 3. To each end of the transverse pipe 1 is rigidly secured, by means of strong coupling-brackets 4, a pair of parallel forwardly-projecting pipe-sections 5. The laterally-spaced forward wheels 6 of the machine are placed between and are journaled to the forward ends of the corresponding pairs of pipe-sections 5. The coupling-brackets 3 and 4 are preferably made each in two parts or horizontally-split sections, which are rigidly secured together and onto the pipe-sections, which they connect by short nutted bolts passed therethrough. The frame members 1, 2, and 5, while preferably made of pipe-sections in order to obtain a maximum of strength with a minimum of metal, may nevertheless take other forms.

The rear or steering wheel 7 of the machine is journaled in a pronged bracket 8, carried by the lower end of a vertical steering-shaft 9, which shaft is loosely journaled in a bearing 10 on the rear end of the push-pole 2. The steering-shaft 9 at its upper end is provided with an operating-lever 11, which, as shown, instead of being rigidly secured to said shaft is pivoted thereto and has adjustable interlocking engagement with a perforated flange 12, rigidly secured to said shaft 9.

The numeral 13 indicates the driver's seat, which is supported from the rear end of the push-pole 2 in such position that the driver seated thereon may readily reach the steering-lever 11 and other parts presently to be described.

Supported by the transverse pipe 1 and having a limited pivotal movement thereon is a pair of parallel uprights or guide-posts 14, the upper ends of which are tied together by a tie-bar 15, connected thereto, as shown, by elbow clamping-brackets 16. The lower ends of the uprights 14 project below the frame-pipe 1 and are connected thereto by coupling-brackets 17, made up of rigidly-connected vertically and horizontally disposed segmental sleeve-sections $17^a$ and $17^b$, the former of which are rigidly bolted to the respective uprights and the latter of which rest upon the frame-pipe 1. The sleeve-segments $17^b$ are provided with slots $17^c$, through which set-screws 18 are loosely passed, and are screwed into the frame-pipe 1. These set-screws 18 permit limited pivotal movements of the uprights 14 with respect to the frame-pipe 1, but prevent the sleeve-sections $17^b$ from rising off from said pipe 1. For the construction just described see particularly Figs. 5 and 6. To the extreme lower ends of the uprights 14 are rigidly secured stop-hooks 19. The uprights 14 are shown as tied together at their central portions by a tie-rod 20, and their end portions are shown as tied together by diagonal truss-rods 21. The uprights 14 and tie-rods 15 and 20 are preferably also constructed of wrought-iron pipe for the sake of lightness and strength.

Rigidly secured on the rear portion of the pole or reach 2 is a notched lock-segment 22, to which is pivoted a coöperating latch-lever 23. To the intermediate portion of the lever 23 is pivoted a coupling block or link 24. To the block 24 are pivoted the rear lower ends of two pairs of inclined stay bars or rods 25 and 26. The upper forwardly-projecting ends of the stay-bars 25 are pivotally connected to the upper portions of the uprights 14, while the upper forwardly-projecting ends of the stay-bars 26 are pivotally connected to the end portions of the tie-rod 20. As is evident, the latch-lever 23 is adapted to be locked in different adjustments on the segment 22, and by movements of said lever the uprights 14 may be set at will in true upright positions, in forwardly-inclined positions, or in rearwardly-inclined positions. The uprights 14 will in practice be made very high, often exceeding twenty feet, and hence the necessity of the intermediate stay-bars 26 to brace the said stays at their intermediate portions. Since the bars 25 and 26 will receive different endwise movements under movements of the lever 23 and the uprights 14, it has been found necessary to pivotally connect the rear ends of said bars to the rocking coupling-block 24, which may be moved pivotally with respect to said lever, and thereby compensate for the different movements of the said bars.

The rake 27, which is in the form of an approximately horizontal deck having approximately straight tines, is mounted to move vertically upon the uprights 14 and, as shown, is provided with a rigidly-secured back 28, made up of cross-slats. Grooved wheels 29, journaled in bearings 30, rigid on the back rail of the rake 27, (see particularly Fig. 5,) run over the front faces of the uprights 14. Pivoted at 31 (see Fig. 1) to rear projections of the rake 27 is a pair of traveler-bars 32, which at their upper ends have grooved wheels 33, that run over the rear faces of the uprights 14 and coöperate with the wheels 29 to support the rake 27 and its load, or a part thereof, from the said uprights and to guide the said rake thereon under its vertical upward and downward movements. A transversely-extended rock-shaft 34 is mounted in forwardly-projecting lugs 35 on the upper ends of the traveler-bars 32. At its ends this rock-shaft 34 is provided with arms 36, that are pivotally connected to links 37, the lower ends of which are pivotally connected to brackets 38 on the sides and intermediate portion of the rake 27. The upper ends of the links 37 are bent so that the arms 36 may be thrown rearward beyond a dead-center, as shown in Fig. 1. The arms 36 and links 37 constitute toggle-levers that connect the intermediate portion of the rake for pivotal movements to the traveler-bars 32 or non-pivotal portions of the vertically-movable rake-carrier. A trip-arm 39 is secured to and depends from one end of the rock-shaft 34. A trip rope or connection 40 is attached to the end of the trip-arm 39 and extends to within reach of the driver on the seat 13. As shown, said trip-rope 40 runs through a perforated guide-arm 41 on the adjacent traveler-bar 32 and through guide-eyes 42 on the adjacent stay-bar 26. On the rock-shaft 34 is a pair of coiled springs 43, that are secured at one end to said rock-shaft and at their other ends press against the arms 36 and yieldingly hold the same in the set positions indicated in Fig. 1. These springs 43 are strong enough to raise the rake 27 when the load is off of the same, and hence to automatically restore the said rake, said arms 36, and links 37 to the position indicated by broken lines in Fig. 1 after the load has been dumped. To raise the rake with its load, a hoisting device is provided, which preferably comprises a pair of ropes or cables 44, that are attached to a common grapple 45 at their rear lower ends. These cables 44 run under guide-sheaves 46 on the coupling-bracket 3, over guide-sheaves 47, mounted in brackets 48 on the tie-bar 15, under guide-sheaves 49, mounted in brackets 50 on the tie-beam 51, and at their upper ends are attached to said brackets 48. The tie-beam 51 rigidly connects the so-called "traveler-bars" 32. As is evident, the fork 27 and its traveler or carrier may be raised and lowered on the uprights 14 by drawing upon or letting out the cables 44.

The numeral 52 indicates an anchord rope or similar device with which the grapple 45 is adapted to be engaged.

The numeral 53 indicates a two-horse evener, which is applied to the rear end of the pole 2.

Operation: The device above described is adapted for use to gather up loose hay or grain which has either been raked into windrows or into cocks, and the machine is pushed ahead by horses hitched to the evener 53. When the rake and its carrier are lowered, as indicated by full lines in Fig. 1, the points or forward ends of the rake-tines may be turned down either into contact with or close to the ground by a forward movement of the lever 23, which acting through the stay-bars 25 and 26 tilts the standards 14 forward. In gathering the hay of a windrow the machine is of course driven longitudinally thereof, and the hay is accumulated on the rake and piled thickest against the skeleton backboard 28. When a full load of hay is accumulated on the rake, the lever 23 should be thrown backward either into the position shown in Fig. 1 or farther backward and downward, and the loaded machine should then be driven to the place where the stack is being formed or is to be formed. The rope or grapple engaging device 52 is secured to the ground the proper distance from the stack, so that when the machine is driven over the same and the grapple 45 engaged therewith it will under the continued forward movement of the machine pull back on the hoisting-cables 44 and raise the rake, together with its load, upon the uprights 14 to the desired altitude by the time the rake is moved to the proper position above the stack. Said anchored rope 52 may of course be moved from time to time as the stack is built up, so that it will cause the rake to be raised higher and higher until the stack is complete. When the rake has been properly raised on the uprights by the means above described, it should be tripped and be allowed to drop into an inclined position, as indicated by dotted lines in Fig. 1, thereby permitting the load of hay to slide off from the rake onto the stack. This tripping of the rake, as already indicated, is easily accomplished by pulley on the trip-rope 40, and thereby forcing the arms 36 upward and forward of their dead-centers and thereby permitting the weight of the load of hay to force the rake into an inclined position. After the load has been dumped the spring 43, as already stated, will force the rake and its toggle connections, made up of the arms 36 and links 37, back into normal or locked positions. The so-called "cables" or flexible connections 40, 44, and 52 may be either in the form of ropes, wires, chains, or other devices suitable for the purposes for which they are intended.

The machine above described has been built and put into actual use and has been found extremely efficient for the purposes had in view. It is very easily operated, is of comparatively small cost, and is strong and durable. It is of light draft, and I have found that a machine capable of carrying ten hundredweight of hay on the rake can be easily driven by two horses. The axes of the front wheels 6 are located forward of the pivotal support for the rake 27 and near the center of gravity of the load of hay which will be accumulated on said rake. Hence no matter what the load on the rake may be the said load cannot possibly tilt upward the rear end of the push-pole 2.

It will of course be understood that the machine described is capable of modifications within the scope of my invention as herein set forth and claimed.

What I claim, and desire to secure by Letters Patent of the United States, is as follows:

1. In a machine of the character described, the combination with a truck, and uprights thereon, of a traveler movable on said uprights, a fork hinged to said traveler, a toggle connecting said traveler to said fork and adapted to be moved from one side to the other of a dead-center, means for raising said traveler and said fork, and means for tripping said toggle to tilt said fork and dump the load, substantially as described.

2. In a machine of the character described, the combination with a truck and uprights thereon, of a traveler movable on said uprights, a fork hinged to said traveler, a toggle connecting said fork to said traveler and movable from one side to the other of a dead-center, a spring operative to throw said toggle into a locking position on one side of the dead-center, connections for raising and lowering said traveler and fork, and a connection for tripping said toggle to dump the load, substantially as described.

3. In a machine of the character described, the combination with a truck and uprights thereon, of a wheeled traveler movable on said uprights, a fork hinged to said traveler, a rock-shaft on said traveler, a pair of toggles connecting said rock-shaft to the sides of said fork and movable from one side to the other of a dead-center, a spring acting on said rock-shaft to force said toggles into locked positions, a flexible connection for raising and lowering said traveler, a trip-arm on said rock-shaft, and a flexible connection extending from said trip-arm, substantially as described.

4. In a machine of the character described, the combination with a truck having laterally-spaced forward wheels, a rearwardly-projecting push-pole, and a steering-wheel at the rear of said pole, of a pair of uprights pivotally connected to the forward portion of the truck-frame, a tilting fork movable vertically on said uprights, means for raising and lowering said fork, a lever mounted on the rear portion of said push-pole, a coupling-block pivoted to said lever, and upper and lower stay-bars pivoted at their lower ends to said coupling-block, and pivotally connected, at their upper ends, to said uprights at different points longitudinally thereof, substantially as described.

In testimony whereof I affix my signature in presence of two witnesses.

EDWARD M. ORTON.

Witnesses:
ROBERT C. MABEY,
F. D. MERCHANT.